Figure 1:
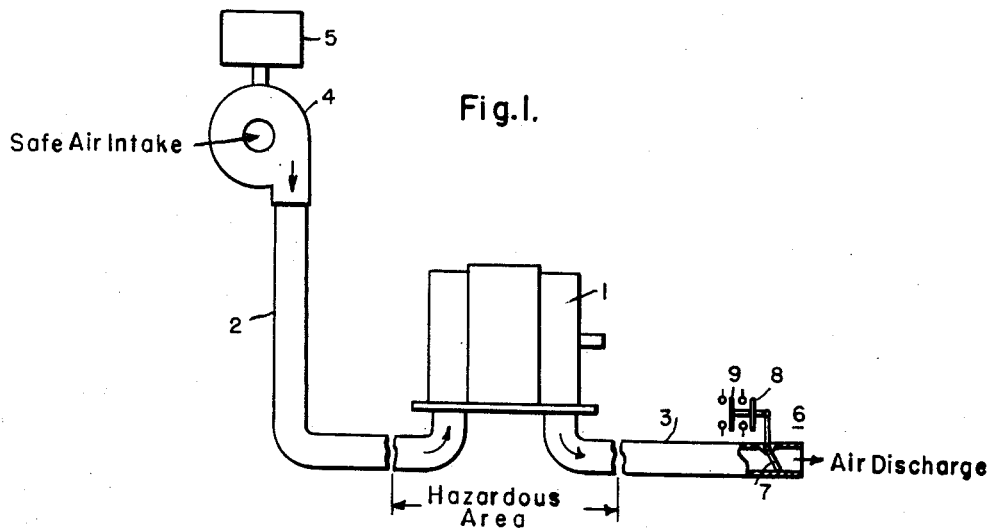

June 20, 1950  M. A. HYDE  2,512,332
VENTILATION OF ELECTRIC MOTORS
Filed March 26, 1949

WITNESSES:

INVENTOR
Merritt A. Hyde.
BY
ATTORNEY

Patented June 20, 1950

2,512,332

UNITED STATES PATENT OFFICE 2,512,332

VENTILATION OF ELECTRIC MOTORS

Merritt A. Hyde, Pittsburgh, Pa., assignor to Westinghouse Electric Corporation, East Pittsburgh, Pa., a corporation of Pennsylvania Application March 26, 1949, Serial No. 83,619

10 Claims. (Cl. 318—102)

The present invention relates to the ventilation of enclosed electric motors, and more particularly to the ventilation of motors located in hazardous atmospheres.

When electric motors are utilized in a location where the air contains, or may contain, inflammable or explosive gases or vapors, as in the pump rooms of pumping stations on oil pipe lines, for example, it is necessary to prevent the air in the room from getting into the motor. Motors intended for use in such hazardous locations are totally enclosed, to exclude the surrounding air from the motor, and motors of the larger sizes are often ventilated by means of a duct system, which is supplied with safe air drawn from outside the hazardous area by means of a blower, and which discharges the heated air from the motor outside the hazardous area. With this type of ventilating system, the entire duct system, including the motor housing, is maintained under a slight pressure above atmospheric, so that any leakage is outward and the hazardous air surrounding the motor is positively prevented from getting into the motor, as long as the ventilating system is in operation. When the motor and ventilating system are shut down, however, there is a possibility of seepage or leakage of hazardous air into the duct work, or the motor housing, which makes it unsafe to restart the motor until after the ventilating system has been started and has had time to completely purge the duct system of any hazardous air that may have gotten into it.

The principal object of the present invention is to provide a ventilating system for enclosed motors, intended for operation in hazardous atmospheres, in which ventilating air is supplied to and discharged from the motor through a duct system, and in which the motor cannot be started until after the ventilating system has been in operation for a long enough time to insure that any hazardous gas has been purged from the duct system.

Another object of the invention is to provide a ventilating system for enclosed motors in hazardous locations, in which ventilating air is supplied to and discharged from the motor through a duct system, and in which means are provided for automatically starting the motor after the lapse of a predetermined time interval after ventilating air has started to flow through the duct system, the time interval being made long enough to insure that the motor can be started with safety.

A further object of the invention is to provide a ventilating system for enclosed motors for operation in hazardous atmospheres, in which ventilating air is supplied to and discharged from the motor by means of a duct system, and in which the discharge of air from the discharge duct is utilized to effect starting of the motor after the lapse of a predetermined time interval which is long enough to insure that the duct system is free of hazardous gases, and in which the motor is immediately stopped if the air flow ceases for any reason.

Figure 2:
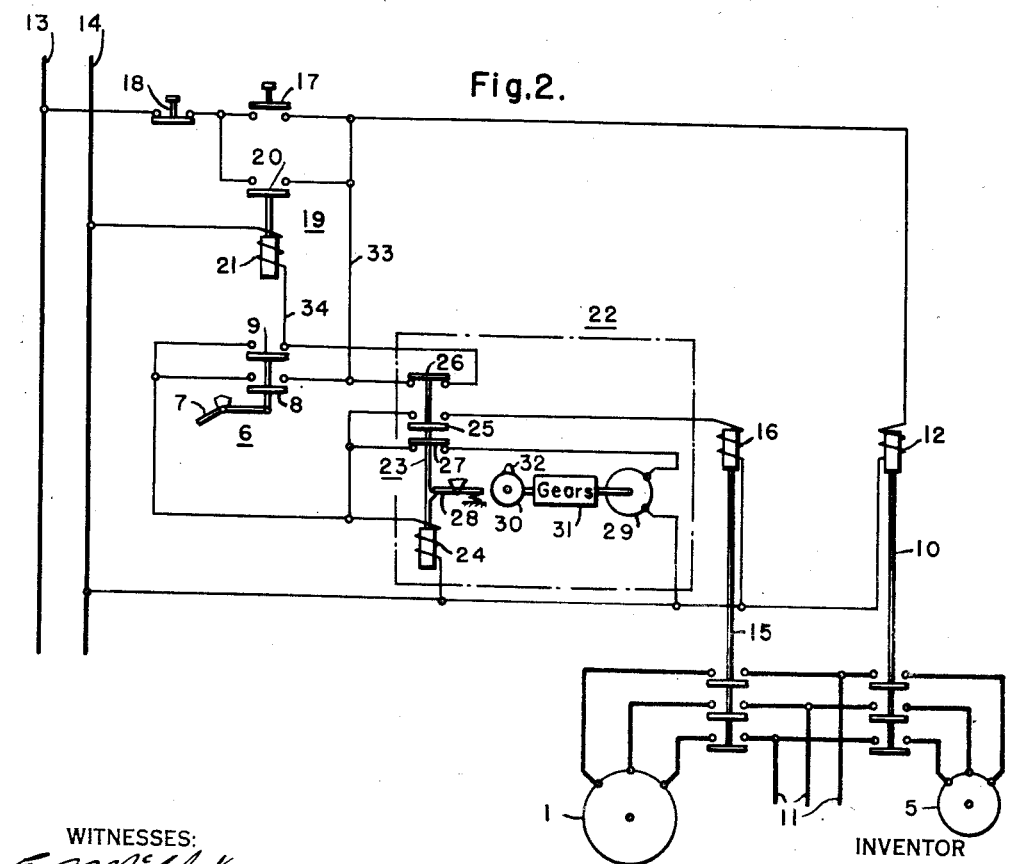

Other objects and advantages of the invention will be apparent from the following detailed description, taken in connection with the accompanying drawing, in which:

Figure 1 is a diagrammatic view illustrating the arrangement of a motor and ventilating system of the type to which the invention relates; and Fig. 2 is a schematic wiring diagram showing a preferred embodiment of the invention.

The invention is shown in the drawing applied to a ventilating system for an electric motor 1, which is intended for use in a hazardous location, such as the pump room of a pipe line pumping station. The motor 1 is totally enclosed to prevent the surrounding air from getting into the motor, and it is ventilated by means of air forced through a duct system, which includes a duct 2 for supplying air to the motor and a discharge duct 3 for the heated air discharged from the motor. The duct 2 extends outside the hazardous area and safe air is drawn in and supplied to the motor 1 by means of a blower 4, of any suitable type, driven by a blower motor 5. The discharge duct 3 preferably also extends outside the hazardous area to discharge the heated air away from the hazardous atmosphere.

In normal operation, the blower 4 supplies ventilating air to the motor 1, and maintains sufficient pressure in the system to insure that any leakage will be outward, so that the air surrounding the motor is positively prevented from getting into the motor or the duct work. When the motor 1 is not in operation, however, and the ventilating system is also shut down, there is a possibility of seepage or leakage of explosive or inflammable vapors into the motor housing or the duct work, and the motor cannot safely be started with this hazardous air in the ventilating system. The present invention, therefore, provides means for preventing the motor 1 from being started unless the ventilating system is in operation and has been in operation for a sufficient length of time to purge the duct system to remove any hazardous gases which may have gotten into the system during the period of shutdown, and for stopping the motor if air flow ceases, for any reason, during operation.

In accordance with the invention, energization of the motor 1 is controlled by an air flow relay 6, which is placed in the discharge duct 3, preferably near the discharge end of the duct, so that it is responsive to discharge of air from the motor. This relay may be of any suitable type, and is shown in the drawing as being actuated by a pivoted vane 7, which is placed in the path of the air flowing through the duct, and which operates, when moved about its pivot by air flow, to close two normally open contacts 8 and 9. It will be apparent that any suitable type of device might be used which will respond to air flow to close the contacts 8 and 9, and keep them closed as long as air flow continues.

Fig. 2 is a wiring diagram showing a suitable system embodying the invention for controlling the motor 1 in response to actuation of the relay 6, to start the motor at the end of a predetermined time interval after air flow has started through the duct 3, and to stop the motor if air flow ceases. As shown in Fig. 2, the blower motor 5 is controlled by a contactor 10, which connects the motor 5 to a three-phase line 11. The contactor 10 has an operating coil 12 which is adapted to be energized from any suitable source of control energy shown as a direct current bus 13, 14. The main motor 1 is controlled by a contactor 15, which connects it to the three-phase line 11, and which has an operating coil 16 adapted to be energized from the bus 13, 14. The system is actuated by means of a normally open start push-button 17, and a normally closed stop push-button 18, which are connected in series with the coil 12 of the blower motor contactor 10 across the bus 13, 14. A holding relay 19 is also provided, which has a contact 20 connected across the start push-button 17, and an operating coil 21 which is energized when the start push-button is actuated, as explained hereinafter, to complete a holding circuit around the push-button.

The control system also includes a timing relay 22. The particular timing relay shown is of a type which is well-known, in itself, and includes a contact element 23 actuated by a coil 24. The contact element 23 is shown as having a normally open contact 25 and two normally closed contacts 26 and 27, and is held in its non-actuated position by means of a latch 28. The timing relay 22 also includes a constant-speed motor 29 which drives a timing disc 30 through a gear train 31. The coil 24 and motor 29 are connected to be simultaneously energized from the bus 13, 14 through the contact 8 of the relay 6, the circuit of the motor 29 also including the normally closed contact 27. When the motor 29 is energized it rotates the timing disc 30 at a speed determined by the gear train 31, so that after a predetermined time has elapsed, a pin 32 on the timing disc 30 engages the latch 28 and releases the contact element 23, permitting the coil 24 to move the contact element to its actuated position, closing the contact 25 and opening the contacts 26 and 27, the contacts being maintained in this position as long as the coil 24 is energized. It will be understood that any suitable type of timing relay may be utilized which will actuate its contacts at the end of a predetermined time and keep them in actuated position until the relay is deenergized.

The operation of this system is as follows.

With both the main motor 1 and the blower motor 5 at rest and the system deenergized, the parts are in the positions shown in the drawing. To start the motor 1, the start push-button 17 is momentarily depressed. This connects the coils 12 of the blower motor contactor 10 across the bus 13, 14 and energizes the contactor so that it connects the blower motor 5 to the line 11. Simultaneously, the coil 21 of the holding relay 19 is connected to the bus 13, 14 through the push-button 17, the conductor 33, the normally closed contact 26 of the timing relay 22, and the conductor 34. The holding relay 19 is thus caused to close its contact 20 to complete a circuit around the push-button 17, so that the push-button can then be released.

When the blower motor 5 is connected to the line 11 by operation of the push-button 17, it starts to run to drive the blower 4 and cause a flow of ventilating air through the duct 2, the motor 1 and the discharge duct 3. As soon as air flow through the discharge duct 3 commences, the air flow relay 6 closes its contacts 8 and 9. Closure of the contact 8 energizes the timing relay 22 from the conductor 33, the coil 24 being connected directly to the contact 8, and the motor 29 being connected to the contact 8 through the normally closed contact 27 of the timing relay. The timing relay 22 is adjusted to provide a time interval which is long enough for any hazardous gases which may have gotten into the duct system to be completely blown out, and the duct system filled with safe air drawn in from the outside. At the end of this time interval, the latch 28 is tripped, as explained above, and the contact element 23 of the timing relay 22 operates to close the contact 25 and open the contacts 26 and 27. The contact 25 is connected in series with the coil 16 of the main motor contactor 15, and when the contact 25 closes, the coil 16 is energized through the contact 8 and conductor 33, thus causing the contactor 15 to close its contacts and connect the main motor 1 to the line, so that it starts. The contact 27 opens at the same time and deenergizes the motor 29 of the timing relay, but energization of the coil 24 is maintained so that the contact element 23 is held in its actuated position. Opening of the contact 26 does not affect the holding relay 19 at this time, since energization of the coil 21 is maintained through the contacts 8 and 9 of the air flow relay 6 in series, so that the relay 19 remains in its actuated position and the coils 12, 16 and 24 remain energized. The blower motor 5 and main motor 1 are both now running, and the system is in its normal operating condition.

If air flow through the discharge duct 3 ceases for any reason, the air flow relay 6 returns to its non-actuated position and opens the contacts 8 and 9. When the contact 8 opens, it interrupts the circuit to the coils 16 and 24 and deenergizes the contactor 15 and the timing relay 22. Thus, the main motor 1 is disconnected from the line 11 and stopped. When the contact 9 of the air flow relay 6 opens, it deenergizes the coil 21 of the holding relay 19, since the contact 26 is still open at that time, and the relay 19 opens its contact 20, deenergizing the coil 12 of the contactor 10 to disconnect the blower motor 5 from the line. When the coil 24 of the timing relay 22 is deenergized by opening of the contact 8, the contact element 23 returns to its non-actuated position, resetting the relay 22 for subsequent operation. Thus, all parts of the system are deenergized in response to cessation of air flow in the duct 3 and it is impossible to restart the motor 1 without going through the starting cycle described above. If it is desired to stop the motor 1 during normal operation, the stop push-button 18 is depressed, and it will be obvious that this immediately deenergizes the entire system, so that the contactors 10 and 15 open, the relay 19 drops out, and the timing relay 22 resets. It will also be obvious that any other desired control or protective devices may be utilized, with their contacts connected in series with the stop push-button 18 to deenergize the system in the same manner.

It should now be apparent that a ventilating system has been provided for enclosing motors which makes it impossible to start the motor until the ventilating system has been in operation long enough to purge any hazardous gases which may have gotten into the ventilating system. This result is accomplished by the use of the air flow relay 6 in the discharge duct, which initiates operation of a timing relay, when actuated by air discharged from the motor, and the timing relay, in turn, effects starting of the motor after the lapse of a predetermined time interval which is made long enough to insure complete purging of the ventilating system. It is to be noted that starting of the motor after the predetermined time is controlled only in response to air flow in the discharge duct, and therefore complete safety is obtained. Thus, a time delay in starting the main motor which is initiated by operation of the starting push-button, or by sequence control from the blower motor contactor or starter, would not protect the motor against being started under hazardous conditions if the air flow should fail from causes beyond the blower motor starter, such as an open circuit between the starter or contactor and the blower motor, failure of mechanical parts between the motor and the blower, or an obstruction or stoppage in the duct system. The ventilating system of the present invention, however, is controlled solely in response to air discharge through the duct 3, and if no air is passing through the system, the main motor 1 cannot be started. Similarly, the motor is positively protected against failure of ventilating air flow during operation, since any cessation of air flow, for any reason whatever, results in immediate stopping of both the main motor and the blower motor.

A specific embodiment of the invention has been shown and described for the purpose of illustration, but it will be understood that various other embodiments and modifications are possible within the scope of the invention, and it is not limited to the particular details or circuit arrangement shown. Thus, either or both of the contactors 10 and 15 may be utilized to control circuit breakers instead of directly connecting their respective motors to the line, and any desired additional control or protective devices may be incorporated in the system. In its broadest aspects, therefore, the invention includes all equivalent embodiments and modifications which come within the scope of the appended claims.

I claim as my invention:

1. In combination, an enclosed electric motor, means for supplying ventilating air to said motor, and means responsive to discharge of air from the motor for effecting starting of the motor after a predetermined time interval.

2. In combination, an enclosed electric motor, means for supplying ventilating air to said motor, time delay means for effecting starting of the motor, and means responsive to discharge of air from the motor for initiating operation of said time delay means to effect starting of the motor after a predetermined time interval.

3. In combination, an enclosed electric motor, means for supplying ventilating air to said motor, and means responsive to discharge of air from the motor for effecting starting of the motor after a predetermined time interval, said last-mentioned means being adapted to effect stopping of the motor upon cessation of air flow from the motor.

4. In combination, an enclosed electric motor, means for supplying ventilating air to said motor, time delay means for effecting starting of the motor, and means responsive to discharge of air from the motor for initiating operation of said time delay means to effect starting of the motor after a predetermined time interval, said last-mentioned means being adapted to effect stopping of the motor upon cessation of air flow from the motor.

5. In combination, an enclosed electric motor, duct means for conveying ventilating air to and from said motor, air-flow responsive means disposed in said duct means in the path of air discharged from the motor, and means actuated by said air-flow responsive means for effecting starting of the motor at the end of a predetermined time interval after air begins discharging from the motor.

6. In combination, an enclosed electric motor, duct means for conveying ventilating air to and from said motor, air-flow responsive means disposed in said duct means in the path of air discharged from the motor, and timing means for effecting starting of the motor after a predetermined time interval, said air-flow responsive means being adapted to initiate operation of the timing means in response to the discharge of air from the motor.

7. In combination, an enclosed electric motor, duct means for conveying ventilating air to and from said motor, air-flow responsive means disposed in said duct means in the path of air discharged from the motor, and means actuated by said air-flow responsive means for effecting starting of the motor at the end of a predetermined time interval after air begins discharging from the motor, said air-flow responsive means being adapted to effect stopping of the motor upon cessation of air flow from the motor.

8. In combination, an enclosed electric motor, duct means for conveying ventilating air to and from said motor, air-flow responsive means disposed in said duct means in the path of air discharged from the motor, and timing means for effecting starting of the motor after a predetermined time interval, said air-flow responsive means being adapted to initiate operation of the timing means in response to the discharge of air from the motor, and said air-flow responsive means being adapted to effect stopping of the motor upon cessation of air flow from the motor.

9. In combination, an enclosed main electric motor, duct means for conveying ventilating air to and from said main motor, blower means for producing a flow of air through said duct means, a blower motor for driving said blower means, means for energizing said blower motor, contact means actuated by the flow of air discharged from the main motor, and timing means for effecting energization of the main motor after a predetermined time interval, said contact means being adapted to initiate operation of the timing means in response to discharge of air from the main motor and to maintain energization of the main and blower motors as long as air flow continues.

10. In combination, an enclosed main electric motor, duct means for conveying ventilating air to and from said main motor, blower means for producing a flow of air through said duct means, a blower motor for driving said blower means, means for energizing said blower motor, contact means actuated by the flow of air discharged from the main motor, timing means for effecting energization of the main motor after a predetermined time interval, said contact means being adapted to initiate operation of the timing means in response to discharge of air from the main motor, and the contact means being adapted to effect deenergization of the main motor and of the blower motor in response to cessation of air flow.

MERRITT A. HYDE.

REFERENCES CITED

The following references are of record in the file of this patent:

UNITED STATES PATENTS

| Number | Name | Date |
| --- | --- | --- |
| 2,166,685 | Henderson et al. | July 18, 1939 |
| 2,467,181 | Barnard et al. | Apr. 12, 1949 |